United States Patent [19]

Slovinsky et al.

[11] 4,024,097

[45] May 17, 1977

[54] STABLE WATER-IN-OIL EMULSION POLYMERS WITH SMALL PARTICLE SIZE

[75] Inventors: Manuel Slovinsky, Woodridge; John R. Hurlock, Hickory Hills, both of Ill.

[73] Assignee: Nalco Chemical Company, Oak Brook, Ill.

[22] Filed: Nov. 19, 1975

[21] Appl. No.: 633,304

[52] U.S. Cl. ............... 260/29.6 N; 260/29.6 WQ; 260/29.6 HN; 260/29.6 Z

[51] Int. Cl.² ..................................... C08L 33/02

[58] Field of Search ............. 260/29.6 N, 29.6 HN, 260/29.6 WQ, 29.6 Z, 23 EM, 404; 252/356, 357

[56] References Cited

UNITED STATES PATENTS

| | | | |
|---|---|---|---|
| 3,387,008 | 6/1968 | Cawley | 260/404 |
| 3,624,019 | 11/1971 | Anderson et al. | 260/29.6 H |
| 3,634,284 | 1/1972 | Benson et al. | 252/357 |

*Primary Examiner*—M. J. Welsh

*Attorney, Agent, or Firm*—John G. Premo; Robert A. Miller; Barry W. Sufrin

[57] ABSTRACT

Stable water-in-oil emulsions of water soluble ethylenically unsaturated polymers are prepared using as a water-in-oil emulsifying agent a partially esterified lower N,N-dialkanol substituted fatty amide.

Additionally, from 5–50 weight percent of the surfactant may be from surfactants of the following classes:
A. Salts of fatty tertiary amines, said fatty tertiary amine having one alkyl group containing from 15–22 carbon atoms, and two alkyl groups having from 1–3 carbon atoms, said salt selected from the group of anions consisting of halogens, sulfate, and sulfite;
B. Quaternary salts of the above fatty tertiary amines;
C. Alkali metal salts of fatty acids containing 15–22 carbon atoms; and,
D. Alkyl or alkyl aryl sulfates and sulfonates containing 8–22 carbon atoms.

The above system yields latices of small particle size having improved storage stability.

6 Claims, No Drawings

STABLE WATER-IN-OIL EMULSION POLYMERS WITH SMALL PARTICLE SIZE

Stable water-in-oil emulsions of water soluble vinyl addition polymers are now well known in the art. The technological history of these water-in-oil emulsions can be seen by viewing Vanderhoff, U.S. Pat. No. 3,284,393 which was in turn followed by the Anderson, et al. U.S. Pat. Nos. 3,624,019; Re. 28,474; 3,734,873 and 3,826,771. While the above references have provided a distinct improvement in the art, the water-in-oil emulsions produced by the techniques outlined above may still be improved. Serious problems associated with the stable water-in-oil emulsions of the prior art have been that these 'emulsions' tend to settle over a relatively short period of time and must often be redispersed by mixing. Also, due to the viscosities of these emulsions the concentration of the polymer has been severely limited. Also, in order to produce emulsions having the desired concentration of polymer, large amounts of oil for the hydrophobic phase must be used which due to current economic considerations raises the cost of the water-in-oil emulsions. Our invention allows for emulsions containing greater amounts of polymer while using less of the hydrophobic oil phase. That is, emulsions prepared by the use of our invention can be prepared having a greater water-in-oil ratio than heretofore thought possible. We have found that by carefully selecting surfactants for systems such as the water-in-oil emulsions of Anderson, et al. these problems can be eliminated and a water-in-oil emulsions of a water soluble vinyl addition polymer having improved properties may be produced.

OBJECTS

It is, therefore, an object of our invention to provide to the art a new emulsifier system which will produce water-in-oil emulsions of water soluble vinyl addtion polymers having improved stability, lower viscosity, smaller particle size, and less hydrophobic phase while maintaining an equivalent or higher percentage of polymer.

A further object of our invention is to provide to the art a novel surfactant system for the preparation of water-in-oil emulsions of water soluble vinyl addition polymers consisting largely or entirely of a lower dialkanol fatty amide which has been partially esterified.

A still further object of our invention is to provide to the art an improved surfactant system for preparing stable, small particle size water-in-oil emulsions of water soluble vinyl addition polymer, said surfactant system comprising a partially esterified lower dialkanol fatty amide and at least one other surfactant from the group consisting of: unesterified dialkanol fatty amide; quaternary ammonium salts of fatty tertiary amines; salts of fatty tertiary amines; alkali metal salts of fatty acids; and, alkyl or alkyl aryl sulfates or sulfonates.

THE INVENTION

Work on improving the water-in-oil emulsions of water soluble vinyl addition polymers as disclosed by the Anderson, et al references listed above was initiated to improve the stability of these types of emulsions. Work centered on the study of emulsifiers useful in this type of process because it was believed that they represented the most critical component of the emulsion, and because it was foreseen that each polymeric system would require a different optimum emulsifier system.

An investigation of the effects of various types of emulsifiers on the stability of inverse polymeric emulsions has shown that dialkanol amide type emulsifiers and especially N-alkanol amide emulsifiers blended with coemulsifiers increase settling time by up to 3600 percent and the pourability by up to 400 percent over polymers made by the use of the Anderson, et al. patents.

Application of proper blends of dialkanol amide emulsifiers has been discovered for a variety of polymer compositions with no significant change in the extremely high molecular weight obtained through the use of the technique of Anderson, et al. Particle size averages of 0.2 to 0.4 microns were obtained by the use of the emulsifier systems of our invention with the further result being that the polymer latexes were less viscous. This in turn permits the incorporation of more polymers and/or water and less hydrophobic oil to the emulsion without exceeding the viscosity obtained by the use of Anderson et al. techniques.

THE WATER-IN-OIL EMULSIONS

The water-in-oil emulsions of our invention are basically described in Anderson, et al. U.S. Pat. Nos. 3,624,019; 3,826,771; 3,734,873 and Re 28,474 which will hereinafter be incorporated by reference into this specification.

In general, the polymer emulsions of our invention are stable yet at the same time contain relatively large amounts of polymer. The polymers dispersed in the emulsion are quite stable when the particle size of the polymer is within the range of 2 millimicrons up to about 5 microns. The preferred particle size is within the range of 2 millimicrons and 3 microns.

The stable water-in-oil emulsion comprises:
1. An aqueous phase;
2. A hydrophobic liquid, and
3. A water-in-oil emulsifying agent.

The polymer-containing emulsion of this invention is comprised of an aqueous phase ranging between 30 and 95% by weight of the emulsion. The aqueous phase is defined as the sum of the polymer or copolymer and the water present in the composition. The preferred range is between 70 and 90% by weight of the emulsion. The most preferred range is between 70 and 80% by weight of the emulsion.

The present invention has a polymer concentration between 10 and 50% by weight of the emulsion. A preferred range is between 25 and 45% by weight of the emulsion. The most preferred range is between 25 and 35% by weight of the emulsion.

The polymers most commonly used in application of this invention are acrylamide polymers which include polyacrylamide and its water-soluble copolymer derivatives such as, for instance, acrylic acid, methacrylic acid, itaconic acid, acrylonitrile, and styrene. The copolymers contain from about 5 to 95% by weight of acrylamide. The molecular weights of such polymers and copolymers exceed 500,000.

A polymer also useful in the practice of this invention is hydrolyzed polyacrylamide which has from 1 to 50% of the original carboxamide groups hydrolyzed to carboxyl groups. The molecular weights of the hydrolyzed polyacrylamides range from 500,000 to 1 million or more.

The molecular weight of the polymers described above may vary over a wide range, e.g., 10,000 to 25 million. The preferred polymer has a molecular weight in excess of 1 million.

The organic or oil phase of the emulsion is comprised of an inert hydrophobic liquid. The hydrophobic liquid comprises between 5 and 70% by weight of the emulsion. The preferred range is between 5 and 40% by weight of the emulsion. The most preferred range is between 15 and 30% by weight of the emulsion.

The oils used in preparing these emulsions may be selected from a large group of organic liquids which include liquid hydrocarbons and substituted liquid hydrocarbons. A useful group of organic liquids are hydrocarbons compounds, which contain from 4 to 8 carbon atoms or higher. Thus, such organic hydrocarbon liquids as benzene, xylene, toluene, mineral oils, kerosenes, naphtha, and in certain instances, petroleums may be used. A particularly useful oil from the standpoint of its physical and chemical properties is the branchchain isoparaffinic solvent sold by Humble Oil and Refinery Company under the tradename "Isopar M". Typical specificiations of this narrow-cut isoparaffinic solvent are set forth below in Table I.

TABLE I

| Specification Properties | Minimum | Maximum | Test Method |
| --- | --- | --- | --- |
| Gravity, API at 60/60° F | 48.0 | 51.0 | ASTM D 287 |
| Color, Saybolt | 30 | — | ASTM D 156 |
| Aniline point, ° F | 185 | — | ASTM D 611 |
| Sulfur, ppm | — | 10 | ASTM D 1266 (Nephelometric mod.) |
| Distillation, ° F | | | |
| IBP | 400 | 410 | |
| Dry point | — | 495 | |
| Flash point, ° F (Pensky-Mertens closed cup) | 160 | — | ASTM D 93 |

The water-in-oil emulsifying agent is usually present in amounts ranging between 0.1 and 21.0% by weight of the emulsion. The preferred range is between 1.0 and 15.0% by weight of the emulsion. The most preferred range is between 1.2 and 10% by weight of the emulsion.

THE IMPROVED SURFACTANT SYSTEM

According to Stokes Law, the settling rate of noninteracting particles in dilute inverse polymer latices is governed by the relationsip:

$$\frac{dx}{dt} = \frac{2r^2 g (dp - dm)}{9 \eta}$$

where
$r$ = radius of particles, cm
$g$ = gravity acceleration constant, 980 cm/sec$^2$
$dp$ = density of particles, grams/cm$^3$
$dm$ = density of medium, (0.78 gm/cm$^3$)
$\eta$ = viscosity of medium poise By this relationship it is, therefore, possible to increase the stability of the inverse latex by
A. Increasing the density of the oil phase
B. Increasing the viscosity of the oil phase, or by
C. Reducing the size of particles formed during the polymerization.

Factors which become important in the reduction of particle size during polymerization include the emulsifier, rate of agitation, aqueous phase/oil phase ratio, and the polymer composition.

The work of Ford and Furmidge, "Studies at Phase Interfaces" Part II *Journal of Colloid and Interface Science*, Vol. 22, pp 331–341 (1966), reported that the sorbitan fatty esters (such as those typically used and suggested for use in the latex polymers of Anderson, et al) produced very stable water/oil droplets with a half life of 150 seconds but having a fairly high interfacial tension (i.e. 6.7 dynes/cm). However, they also reported that ethoxylated fatty amides such as N,N-diethanol oleamide produced equally stable water/oil droplets having a life of 100 seconds but with significantly lower interfacial tension (0.5 dynes/cm).

Based on this work and further experimentation, it was discovered that only certain surfactants which fall within this category would produce stable latices due to the compatibility of the surfactant with the oil phase of the emulsion. Thus, the surfactants selected must be soluble, or be made soluble by the use of a cosurfactant in the particular compound selected as the hydrophobic phase. For instance, with Isopar M only those surfactants composed largely of oleic or linoleic fatty amides proved to be compatible. It is suspected and contemplated within our invention that other surfactants having greater or lower carbon chain lengths will perform adequately based on the type of oil selected. For instance, if the oil phase selected is benzene, it is contemplated within our invention that fatty amides having shorter chains than oleic will perform adequately. It is only important that the surfactants selected for use in our invention conform to the chain description which we have enumerated and that are soluble in the oil phase selected, or are made soluble by the use of a cosurfactant.

The primary surfactants selected for use in our invention are generally fatty amides which may or may not be substituted. The fatty groups which we have found to perform satisfactorily generally contain from 15–22 carbon atoms. One class of preferred surfactants contemplated for use in our invention are N,N-dialkanol substituted fatty amides. In this case, the alkanol group should generally contain from 2–6 carbon atoms. Additionally, the N,N-dialkanol fatty amides may be esterfied with fatty acids containing 15–22 carbon atoms.

We have found that it is often times preferred to incorporate a second surfactant as a coemulsifier. Examples of suitable classes of coemulsifiers, which are oil soluble or can be made soluble by use of the primary surfactant include but are not limited to: alkali metal salts of fatty acids containing 15–22 carbon atoms; salts of fatty tertiary amines containing from 15–22 carbon atoms; the anion "salt" group being selected from the group consisting of halogens including chlorine and bromine; sulfates, nitrates, and sulfites.

An additional class of surfactants which may be used as a cosurfactant in our invention include alkyl or alkyl aryl sulfates and sulfonates containing 8–22 carbon atoms. A particularly preferred class of cosurfactants include the quatenary ammonium salts of fatty tertiary amines having at least one alkyl group containing 15–22 carbon atoms in the fatty group with the other two alkyl groups containing 1–3 carbon atoms. In this case, the amine may be quaternarized with any number of well known quaternizing agents including but not limited to dimethylsulfate, methylchloride and ethylchloride.

When a cosurfactant is used within the course of our invention, it will generally comprise from 5–80 percent by weight of the total surfactant used.

The N-alkanol fatty amide type surfactants that are used as the primary emulsifiers in the course of our invention are oil soluble; and as stated above, contain from 15–22 carbon atoms in the fatty group. When these compounds are esterified with fatty acids containing 15–22 carbon atoms, often times a mixture of esterified products will result.

We have found that a particularly advantageous emulsifier in the scope of our invention is "Witcamide 511", a commercially available surfactant, available from the Witco Chemical Company which we believe to contain approximately 50% unesterified N,N-diethanol fatty amide, the fatty groups present on the emulsifier chain containing approximately: 64 percent oleyl; 33 percent linoleic; and, 3 percent palmityl. Additional, approximately 40% by weight of the surfactant is believed to be the monoesterified variation of the above compound, the ester group containing from 15–22 carbon atoms. Additionally, small amounts of the diesterified material are also present.

When using a surfactant of the above type by itself, the lower N,N-dialkanol fatty amide is generally esterified with a fatty acid in a mole ratio of fatty acid to amide of 0.25:1 to 0.75:1. It is important within the scope of our invention that the emulsifier contain at least some esterified groups, although as seen from the above mole ratio of reactants, a surfactant containing a significant portion of unesterified lower dialkanol fatty amide will also perform adequately within the scope of our invention.

The emulsifiers are used in the water-in-oil emulsion of the water soluble vinyl addition monomer or polymer in the same percentages as those described by Anderson, et al and enumerated earlier in this specification.

In summary, the method of our invention encompasses the preparation of water-in-oil emulsions of water soluble vinyl addition polymers and copolymers of the general type wherein a water-in-oil emulsion is formed consisting of a water-soluble ethylenical unsaturated monomer having a water solubility of at least 5 weight percent and aqueous solutions thereof, in an inert hydrophobic liquid organic dispersion medium containing between 0.1 and 21.0 percent by weight of a water-in-oil emulsifying agent, wherein the proportion of monomer phase ranges between 30 and 70 percent of the emulsion, heating the emulsion under free radical forming conditions to polymerize the monomer in a disperse phase in said dispersion medium and recovering the polymerized latex product using as a water-in-oil emulsifying agent an oil soluble partially esterified lower N,N-dialkanol fatty amide wherein the fatty group contains from 15–22 carbon atoms, said esterifying agent being a fatty acid containing 15–22 carbon atoms and being reacted with the lower N,N-dialkanol fatty amide in a mole ratio of fatty acid to amide of 0.25:1 to 0.75:1.

EXAMPLES

EXAMPLE I

In order to show the surprising results obtained by using the emulsifiers of our invention, several water-in-oil emulsions of a methacrylic acid-acrylamide polymer were run using both the sorbitan monooleate shown by Anderson et al. and with surfactants of our invention.

PROCEDURE

All polymerizatins were carried out in 1½ to 2 liter Pyrex resin reactors. Equipment included 75 mm teflon blade stirrers driven at 800 to 1200 RPM by Lightning Model V-7 motors. Agitation speed was measured with a Model 24 Pioneer Photo-tach.

Nitrogen metered at 2000 cc/min. by Fisher Porter flowmeters was bubbled through a teflon-tipped stainless steel gas dispersing tube under the surface of the emulsion throughout the reaction. "Air Stops" (see U.S. Pat. No. 3,767,629) were periodically administered by mixing 750 cc/min. of air with $N_2$ sparge for 10 seconds.

Other reactor equipment included a thermometer, an electric mantle, and ¼ inch stainless steel sampling tubes with metal stopcock fittings for connection to a syringe.

A U.S. Standard Sieve, No. 60 (mesh) was used to filter all particles larger than 250 microns from each latex.

A Brookfield Viscometer, Model LVT, was used to measure the viscosity of each latex at 25° C. Either a Model CL International Centrifuge, operated at 2500 RPM or a Dynac Centrifuge operated at 2280 RPM were used to determine latex settling at 350 times the force of gravity (G's). Both centrifuges were equipped with 4 place, 50 ml horizontal heads holding heavy-walled 40 ml. glass centrifuge tubes. Saran Wrap covered each tube to eliminate evaporation of water of Isopar M during the six hour sedimentation tests.

To the above equipment was charged:
40.3 parts by weight water,
26.595 parts acrylamide,
1.670 parts methacrylic acid,
1.790 parts 50 percent caustic,
0.006 parts ethylenediamine tetraacetic acid (sodium salt)
28.0 parts Isopar M,
1.060 parts of the emulsifier selected, and
0.29 Azobisisobutyronitrile The polymerizations carried out in accordance to the above method are summarized in Table II below.

TABLE II

| Emulsifier Types | Agitation RPM | Latex Particles dn,um | Latex Setting at 350 G's 6 hr. Pourable |
|---|---|---|---|
| Sorbitan Monooleate | 1000 (approx.) | 1.04 | 18% |
| Witcamide 511 | 800 | 1.20 | 33% |
|  | 1200 | 0.75 | 60% |
| Isopropanol Oleamide | 800 | 1.24 | 28% |
|  | 1200 | 0.86 | 70% |

While neither of the monooleate amides produced significantly smaller particles than the sorbitan monooleate, at higher agitation, the stability of the latex polymers produced was significantly improved over the use of the sorbitan monooleate emulsifier system.

Scanning electromicrographs to determine particle size were made using latex samples enriched with 5% additional emulsifiers and diluted approximately 50:1 with distilled Isopar M. The pourability of the latex and settling characteristics were determined by centrifuging using the centrifuge equipment and techniques listed above. The pourability of each latex after six hours at 359 G's was determined by inverting the centrifuge tubes 180° and measuring the percentage of the latex which flowed from the tubes in one minute.

EXAMPLE II

Alkanolamides, having two or more hydroxyl moieties per fatty chain, formed stable emulsions in Isopar M with a methacrylic acid-acrylamide monomer combination as above. Polymerizations were conducted as in Example I, and results including particle size and latex settling rates being found in the following table. As seen both particle size and settling rates were greatly improved over a similar polymerization run with the sorbitan emulsifier (see Examples I).

TABLE III

| Witcamide 511 plus | Agitation RPM | Latex Particles dn,um | Latex Settling at 350 G's 6 hr. Pourable |
|---|---|---|---|
| 50% N,N-diethanol-Oleamide | 800 | 0.23 | 83% |
|  | 1200 | 0.18 | 81% |
| 50% N,N-diisopropanol-Oleamide | 800 | 1.29 | 25% |
|  | 1200 | 0.67 | 27% |
| 25% Oleamide reacted with 5 moles ethylene oxide | 800 | 0.35 | 75% |
|  | 1200 | 0.36 | 68% |

EXAMPLE III

A series of ionic fatty amine quats, and fatty amido amine quats were synthesized as cosurfactants. All active oil/water emulsifiers, these emulsifiers were tested in combination with varying amounts of Witcamide 511 until the combination which produced the most stable methacrylic acid-acrylamide latex (as per Example I) was empirically determined.

TABLE IV

| Witamide 511 Plus | Viscosities ($[\eta]$) dl/gm | Latex cps | Latex Particles dn,um | Latex Settling at 350 G's 6 hr. Pourable |
|---|---|---|---|---|
| 10% N,N-dimethyl-amino propyl oleamide | 10.6 | 425 | 0.21 | 82% |
| 15% Oleamidopropyl Trimethyl Ammonium Sulfate | 16.4 | 180 | 0.23 | 71% |
| 15% Hydrogenated Tallow trimethyl Ammonium sulfate | 15.7 | 575 | 0.36 | 69% |
| 10% Soya Trimethyl Ammonium Sulfate | 15.7 | 400 | 0.22 | 82% |
| 10% Soya Dimethyl Benzyl Ammonium Chloride | 14.9 | 300 | — | 79% |

As expected the quats showed little chain transfer activity and in combination with 85–90% Witcamide 511 the Soya amine quats and the oleamidopropyl trimethyl ammonium sulfate produced very stable latices with 0.23 micron particles.

The oleamidopropyl trimethyl ammonium sulfate (OPTAS) latex in particular had a Brookfield viscosity of only 180 cps whereas a typical latex having the same monomer composition using sorbitan monooleate had a viscosity of 1410 cps (at 6 RPM). In their work on water/benzene emulsions, Albers and Overbeck, "Stability of the Emulsion of Water in Oil," *Journal of Colloid Science* (Part II Vol. 14, Pages 510–518 (1959), Part III Vol. 15, Pages 489–502 (1960)), reported that droplets in concentrated inverse emulsions prepared with Span 60 (or ) were usually flocculated. This increased not only their effective (i.e. Stokes) diameter during settling but it also increased the viscosity of the latex because part of the continuous phase was immobilized within aggregates so that the effective volume fraction of the particles was increased. The lower viscosity of the OPTAS methacrylic acid-acrylamide latex probably results from a lower degree of particle aggregation which effectively reduces their volume fraction in the latex.

EXAMPLE IV

Since it is known that monomer compositions will effect the stability of a given system with a given emulsifier, work was carried out to examine the effects of the alkanolamide based emulsifier system using inverse emulsions of various monomer content. These systems were carried out in the same manner as the methacrylic acid latices described in Example I but using an agitation speed of 1200 revolutions per minute.

With a cationic monomer system comprising 25% dimethylamino ethylmethacrylate HCl-75% acrylamide polymer, no significant changes in the alkanolamide surfactants were necessary.

Runs were made using this system. Polymerizations were carried out at a pH of 3.0 in equipment substantially as described using an agitation speed of 1200 RPM. These results are summarized in Table V.

TABLE V

| Emulsifier 5.19% based on Monomer | Latex Compositions | | | Viscosities | Latex Particles | | Latex Settling at 350 G's |
|---|---|---|---|---|---|---|---|
|  | % Polymer | % Water | % Isopar M | Latex cps | $Dn^3$ um | $Dv^4$ um | 6 hr. Pourable |
| Sorbitan Monooleate | 28.3 | 44.0 | 26.3 | 1340 | 1.58 | 2.18 | 21% |
| 90% Witcamide 511 + 10% Tall Oil Fatty Amidopropyl Trimethyl Ammonium Sulfate[1] | 28.3 | 44.0 | 26.3 | 325 | 0.39 | 0.60 | 76% |
| 50% Witcamide 511 + 50% Diethanol Oleamide | 28.3 | 44.0 | 26.3 | 375 | — | — | 78% |
| 90% Witcamide 511 + 10% Dimethyl Aminopropyl Fatty Amide[2] | 28.3 | 44.0 | 26.3 | 335 | 0.28 | 0.35 | 75% |
| 90% Witcamide 511 + 10% Fatty Amidopropyl Trimethyl Ammonium Sulfate[1] | 28.3 | 51.6 | 18.8 | 1925 | — | — | 80% |
| 50% Witcamide 511 + 50% Diethanol Oleamide | 28.3 | 51.6 | 18.8 | 1175 | — | — | 73% |
| 90% Witcamide 511 + 10% Dimethyl Aminopropyl | | | | | | | |

TABLE V-continued

| Emulsifier 5.19% based on Monomer | Latex Compositions | | | Viscosities | Latex Particles | | Latex Settling at 350 G's |
|---|---|---|---|---|---|---|---|
| | % Polymer | % Water | % Isopar M | Latex cps | Dn[3] um | Dv[4] um | 6 hr. Pourable |
| Fatty Amide[2] | 28.3 | 51.6 | 18.8 | 1800 | — | — | 80% |

[1] "Unamide DMAPA" quaternized with dimethyl sulfate
[2] "Unamide DMAPA" available from Lonza, Inc.
[3] Number average particle size
[4] Volume average particle size With a polymer containing 52% acrylic acid and 48% acrylamide, significantly higher HLB requirement than either of the above two materials were required. It was empirically determined that the ratio of hydrophilic emulsifiers OPTAS to Witcamide 511 must be at least 20/80 to optimize the stability of this type of latex. However, it was also determined that hydrophilic co-emulsifiers with weak and strong anionic moieties such as sodium oleate and sodium oleyl sulfate worked as well as the previously tested nonionic or cationic surfactants. Here again the alkanolamide surfactant blends produced latices which were significantly more stable but less viscous than the corresponding latices prepared with the low or high HLB sorbitan fatty ester.

A series of polymerizations using this monomer system and the emulsifiers of our invention were carried out. Similar equipment to that previously described was used with the results being found on Table VI.

a period of 15 minutes, 6.4 milliters of a solution containing 0.04 grams/ml of azobisisobutyronitrile was then added. The emulsion was reacted for five hours at a temperature at 45° – 50° C. At the end of five hours the resulting 29.2% polymer latex had a viscosity of 950 cps. at 25° C. The latex also had a number average particle size of 0.83 microns and a volume average particle size of 1.80 microns. The resulting latex had a 20% pourable at the end of six hours.

EXAMPLE VI

To a similar equipped 1½ liter resin flask was charged 120 grams of Isopar M, 1.07 grams of OPTAS and 9.6 grams of "Witcamide 511". A monomer solution was made up containing 238.4 grams of crystalized acrylamide, 247 grams of water, 17.6 grams of methacrylic acid and 2.7 grams of an aqueous solution of sodium EDTA. The pH of the monomer solution was

TABLE VI

| Emulsifier 4.3% based on Monomer | Latex Composition | | | | Viscosities | Latex Particles | | Latex Settling at 350 G's |
|---|---|---|---|---|---|---|---|---|
| | Catalyst % Bom[1] | Polymer % | Water % | isopar M % | Latex cps | Dn[2] um | Dv[3] um | 6 hrs. Pourable |
| Span 80 | 0.15 | 23.2 | 48.2 | 27.6 | 500 | 1.68 | 2.40 | 29% |
| 75% Witcamide 511 + 25% Diethanol Oleamide | 0.15 | 30.8 | 41.2 | 26.6 | 350 | 0.27 | 0.48 | 77% |
| 50% Witcamide 511 + 50% Sodium Oleate | 0.15 | 30.8 | 41.2 | 26.6 | 775 | 0.81 | 1.33 | 40% |
| 55% Witcamide 511 + 45% Sodium Oleate | 0.05 | 25.4 | 53.0 | 20.5 | 600 | 0.72 | 1.06 | 37% |
| 80% Witcamide 511 + 20% Sodium Oleyl Sulfate | 0.05 | 25.4 | 53.0 | 20.5 | 1400 | 0.71 | 1.04 | 22% |
| 80% Witcamide 511 + 20% Oleamidopropyl Trimethyl Ammonium Sulfate | 0.15 | 30.8 | 41.2 | 26.6 | 600 | 0.43 | 0.73 | 63% |

[1] Based on Monomer
[2] Number average particle size
[3] Volume average particle size In addition, when emulsions were prepared with 100 percent acrylamide using the alkanolamide emulsifiers of our invention, the alkanolamide systems greatly inhanced stability of emulsions of this type as compared to runs made using sorbitan fatty esters.

In order to show the superiority of the instant emulsifier systems over the prior art in the preparation of a latex containing a high percentage of polymer, the following experiments were performed:

EXAMPLE V

To a two liter resin which was equipped with stirrer, thermometer, nitrogen sparge tube and otherwise as substantially described on pages 13 and 14 was charged 247.0 grams of Isopar M which had dissolved therein of 14.4 grams of Span 80, a commercially available sorbitan monooleate. A monomer solution comprising 238.4 grams of crystalized acrylamide, 258.2 grams of deionized water, 17.6 grams of methacrylic acid, 2.7 grams of a 2% aqueous solution of sodium EDTA and adjusted to a pH of 8.5 with 16.5 grams of 50% NaOH was prepared and then added to the Isopar M solution with sitrring. The resulting emulsion was purged with nitrogen for one half hour and was then heated to 45° C over adjusted to 8.5 with 16.4 grams of 50% NaOH. The reaction was carried out in the same manner as that of Example V with an equivalent catalyst charge. At the end of seven hours, a 40% solid polymer latex was recovered which had a viscosity of 1,360 cps. This latex had a number average particle size of 0.22 microns and a volume average particle size of 0.3 microns. The latex was 65% pourable at the end of six hours. An equivalent emulsion containing 40% polymer prepared by the use of Span 80 was unstable.

We claim:

1. In a method for preparing water-in-oil emulsions of water soluble vinyl addition polymers and copolymers of the general type wherein a water-in-oil emulsion is formed consisting of a water-soluble ethylenically unsaturated monomer having a water solubility of at least 5 weight percent and aqueous solutions thereof, in an inert hydrophobic liquid organic dispersion medium containing between 0.1 and 21.0 percent by weight of a water-in-oil emulsifying agent, wherein the proportion of monomer phase ranges between 30 and 95% of the emulsion, heating the emulsion under free radical forming conditions to polymerize the monomer in a disperse phase in said dispersion medium and recovering the polymerized latex product, the improvement which comprises using a water-in-oil emulsifying agent an oil soluble partially esterified lower N,N-dialkanol fatty amide wherein the fatty group contains from 15–22 carbon atoms, said esterifying agent being a fatty acid containing 15–22 carbon atoms and being reacted with the lower N,N-dialkanol fatty amide in a mole ratio of fatty acid to amide of 0.25:1 to 0.75:1.

2. The method of claim 1 wherein the lower N,N-dialkanol fatty amide is N,N-diethanol oleamide.

3. In a method for preparing water-in-oil emulsions of water soluble vinyl addition polymers and copolymers of the general type wherein a water-in-oil emulsion is formed consisting of a water-soluble ethylenically unsaturated monomer having a water solubility of at least 5 weight percent and aqueous solutions thereof, in an inert hydrophobic liquid organic dispersion medium containing between 0.1 and 21.0 percent by weight of a water-in-oil emulsifying agent, wherein the proportion of monomer phase ranges between 30 and 95% of the emulsion, heating the emulsion under free radical forming conditions to polymerize the monomer in a disperse phase in said dispersion medium and recovering the polymerized latex product, the improvement which comprises using as water-in-oil emulsifying agents:
A. From 5–80% by weight of the total emulsifying agent of an oil soluble quaternary ammonium salt of a fatty tertiary amine, said fatty tertiary amine containing 15–22 carbon atoms, said amine having been quaternized with a compound selected from the group consisting of dimethyl sulfate, methyl chloride, and ethyl chloride; and,
B. As the balance of the total emulsifying agent, an oil soluble partially esterified lower N,N-dialkanol fatty amide wherein the fatty group contains from 15–22 carbon atoms, said esterifying agent being a fatty acid containing 15–22 carbon atoms and being reacted with the lower N,N-dialkanol fatty amide in a mole ratio of fatty acid to amide of 0.25:1.0 to 0.75:1.0.

4. In a method for preparing water-in-oil emulsions of water soluble vinyl addition polymers and copolymers of the general type wherein a water-in-oil emulsion is formed consisting of a water-soluble ethylenically unsaturated monomer having a water solubility of at least 5 weight percent and aqueous solutions thereof, in an inert hydrophobic liquid organic dispersion medium containing between 0.1 and 21.0 percent by weight of a water-in-oil emulsifying agent, wherein the proportion of monomer phase ranges between 30 and 95% of the emulsion, heating the emulsion under free radical forming conditions to polymerize the monomer in a disperse phase in said dispersion medium and recovering the polymerized latex product, the improvement which comprises using as water-in-oil emulsifying agents:
A. From 5–80% by weight of the total emulsifying agent of salts of fatty tertiary amines, said fatty tertiary amine having one alkyl group containing from 15–22 carbon atoms and two alkyl groups having from 1–3 carbon atoms, said salt selected from the group of anions consisting of halogens, sulfate, and sulfite; and,
B. As the balance of the total emulsifying agent, an oil soluble partially esterified lower N,N-dialkanol fatty amide wherein the fatty group contains from 15–22 carbon atoms, said esterifying agent being a fatty acid containing 15–22 carbon atoms and being reacted with the lower N,N-dialkanol fatty amide in a mole ratio of fatty acid to amide of 0.25:1.0 to 0.75:1.0.

5. In a method for preparing water-in-oil emulsions of water soluble vinyl addition polymers and copolymers of the general type wherein a water-in-oil emulsion is formed consisting of a water-soluble ethylenically unsaturated monomer having a water solubility of at least 5 weight percent and aqueous solutions thereof, in an inert hydrophobic liquid organic dispersion medium containing between 0.1 and 21.0 percent by weight of a water-in-oil emulsifying agent, wherein the proportion of monomer phase ranges between 30 and 95% of the emulsion, heating the emulsion under free radical forming conditions to polymerize the monomer in a disperse phase in said dispersion medium and recovering the polymerized latex product, the improvement which comprises using as water-in-oil emulsifying agents:
A. From 5–80% by weight of the total emulsifying agent of alkali metal salts of fatty acids containing 15–22 carbon atoms; and,
B. As the balance of the total emulsifying agent, an oil soluble partially esterified lower N,N-dialkanol fatty amide wherein the fatty group contains form 15–22 carbon atoms, said esterifying agent being a fatty acid containing 15–22 carbon atoms and being reacted with the lower N,N-dialkanol fatty amide in a mole ratio of fatty acid to amide of 0.25:1.0 to 0.75:1.0.

6. In a method for preparing water-in-oil emulsions of water soluble vinyl addition polymers and copolymers of the general type wherein a water-in-oil emulsion is formed consisting of a water-soluble ethylenically unsaturated monomer having a water solubility of at least 5 weight percent and aqueous solutions thereof, in an inert hydrophobic liquid organic dispersion medium containing between 0.1 and 21.0 percent by weight of a water-in-oil emulsifying agent, wherein the proportion of monomer phase ranges between 30 and 95% of the emulsion, heating the emulsion under free radical forming conditions to polymerize the monomer in a disperse phase in said dispersion medium and recovering the polymerized latex product, the improvement which comprises using as water-in-oil emulsifying agents:
A. From 5–80% by weight of the total emulsifying agent of alkyl or aryl sulfates and sulfonates containing 8–22 carbon atoms; and,
B. As the balance of the total emulsifying agent, an oil soluble partially esterified lower N,N-dialkanol fatty amide wherein the fatty group contains from 15–22 carbon atoms, said esterifying agent being a fatty acid containing 15–22 carbon atoms and being reacted with the lower N,N-dialkanol fatty amide in a mole ratio of fatty acid to amide of 0.25:1.0 to 0.75:1.0.

* * * * *